United States Patent
Kfir et al.

(10) Patent No.: US 10,831,166 B2
(45) Date of Patent: Nov. 10, 2020

(54) HYBRID NETWORK MONITORING SYSTEM

(71) Applicant: RADIFLOW LTD., Tel Aviv (IL)

(72) Inventors: Yehonatan Kfir, Givaat Shmuel (IL); Ilan Barda, Raanana (IL)

(73) Assignee: RADIFLOW LTD., Tel Aviv (IL)

( * ) Notice: Subject to any disclaimer, the term of this patent is extended or adjusted under 35 U.S.C. 154(b) by 72 days.

(21) Appl. No.: 16/197,389

(22) Filed: Nov. 21, 2018

(65) Prior Publication Data
US 2020/0159181 A1 May 21, 2020

(51) Int. Cl.
*G05B 19/042* (2006.01)
*H04L 29/06* (2006.01)
*H04L 12/26* (2006.01)
*H04L 29/08* (2006.01)

(52) U.S. Cl.
CPC .......... *G05B 19/0425* (2013.01); *H04L 43/12* (2013.01); *H04L 43/16* (2013.01); *H04L 63/1433* (2013.01); *H04L 67/145* (2013.01)

(58) Field of Classification Search
CPC .................................................. G05B 13/028
See application file for complete search history.

(56) References Cited

U.S. PATENT DOCUMENTS

| 7,684,335 B2 * | 3/2010 | Chen ................... H04L 43/0882 370/236 |
| 2008/0267185 A1 * | 10/2008 | Biskner ................ H04L 41/142 370/392 |
| 2010/0246385 A1 * | 9/2010 | Balasumbramanian ..................... G05B 19/0423 370/222 |
| 2012/0176917 A1 * | 7/2012 | Matityahu ............... H04L 43/12 370/250 |
| 2014/0165182 A1 * | 6/2014 | Curry .................. H04L 63/0209 726/12 |

\* cited by examiner

*Primary Examiner* — Henry Tsai
*Assistant Examiner* — Juanito Borromeo
(74) *Attorney, Agent, or Firm* — A.C. Entis-IP Ltd.; Allan C. Entis; Kenichi N. Hartman (57) ABSTRACT

There is provided a packet monitoring apparatus for monitoring packets copied from an industrial control system (ICS) network, the apparatus being configured to perform an analysis of a plurality of packets copied from the ICS network and generate a digital command signal responsive to the analysis for transmission via a digital input/output channel. There is also provided an active prove that is configured to generate and transmit at least one query packet into the ICS network responsive to a digital command signal, optionally received from the packet monitoring apparatus.

20 Claims, 2 Drawing Sheets

HYBRID NETWORK MONITORING SYSTEM

BACKGROUND

A modern industrial plant is typically a complicated environment comprising an integrated system of automated production equipment, monitoring systems, and computers that control the equipment responsive to data provided by the monitoring systems and human instruction. By way of example, the plant may comprise: production equipment, such as production robots, and chemical reactors; component delivery systems, such as conveyor belts, and pick and place machines; and monitoring systems, such as visual inspection systems and water quality monitors. The various plant components are controlled and monitored in real time to cooperate and automatically perform a production job to which the plant is assigned by control signals transmitted over a plant communication network. Operational Technology (OT) refers to computing systems that are used to monitor events and processes of components in an industrial plant and to manage and control the operation of said plant components (which may be referred to herein as "end devices"). OT is typically used in contradistinction to Information Technology (IT) that refers to computing systems used for data-centric computing for enterprises.

Communication devices and computational resources comprised in an OT system that transmit and receive the control signals through a plant communication network are collectively referred to as an industrial control system ("ICS"). The communications network may be referred to as an ICS network, and individual computational devices of the ICS that are connected to the ICS network may be referred as "ICS elements". The ICS network supports transmission of the control signals between various ICS elements. The control signals are typically in the form of a data packet configured in accordance with a packet-based industrial protocol. A data packet supported by a packet-based industrial protocol typically includes a header that carries certain types of metadata and routing information, and a payload.

One example of an ICS element is an end device controller, which execute pre-determined logic based on the inputs from readings of sensors in order to control outputs by end devices of the plant. These processes typically happen autonomously without requiring input from the operator. The logic stored in a given end device controller, based on which the end device controller performs its actions, may be referred to as a "controller logic". An end device controller may a programmable logic controller (PLC), which typically can also interface with a Supervisory Control and Data Acquisition (SCADA) system, which allows human operators to remotely supervise the ICS by analyzing acquired data from PLCs, based on which they can decide to send commands or trigger alerts to PLCs.

Modern ICS's typically have open architectures and standard technologies highly interconnected with other corporate IT networks and the Internet, and are mostly based on standard embedded systems platforms, applied in various devices, such as routers or cable modems. They also often make use of, at least in part, commercial off-the shelf software, such as, Ethernet, TCP/IP, HTTP and Windows. This standardization has resulted in reduction of costs, improved ease of use, and enabled the remote control and monitoring from various locations. However, an important drawback derived from the connection to intranets and communication networks is the increased vulnerability to computer network-based attacks.

Malfunctioning of, and/or down time, in a modern automated industrial plant is generally extremely expensive and can carry substantial liability. Manufacturing components and processes in the plant are interdependent, and typically must operate in synchrony. Malware damage to a component of an automated industrial plant can therefore be amplified well beyond any particular damage to the component, and well beyond what might be sustained by an enterprise communication and data system or home computer data system damaged by the same malware.

The ICS can be monitored for unusual, potentially malicious activity of the ICS network or states of ICS elements. The ICS may be monitored through passive probing of the ICS network, in which data traversing the ICS network is collected without introducing additional data into the network. Alternatively, with active probing, an active probe transmits "query packets" directed to one or more end device controllers, which trigger the end device controller to transmit a "status packet" which contains information regarding the state of the end device controller. A given set of one or more query packets for a given class of inquiry into the state of one or more end device controllers may be referred to herein as a "scan". A given scan may comprises a plurality of query packets directed as a given end device controller, or an exchange of packets (a "handshake") between the active probe and the end device controller, which, if successfully completed and/or received, elicits a corresponding status packet from the end device controller.

Active probing allows for directed assaying of end device controllers and can substantially reduce the amount of data needed to be collected from an ICS network for effective monitoring. However, because active probing processes require use of an active probe that introduces packets into the ICS network, it can be a potential source of malware or a vector through which an unintended or malicious party can gain access to the ICS network.

SUMMARY

An aspect of an embodiment of the invention relates to providing a passive server having a secure interface with an active probe, thus allowing the active probe to adjust scanning activity responsive to changes and/or events in the ICS as detected by the passive server.

For convenience of presentation, a passive server accordance with an embodiment of the disclosure may be referred as a "Quasi-passive server" or a "QP server". For convenience of presentation, a system for monitoring an ICS network comprising a QP server may be referred to herein as a "Quasi-passive monitoring system" or "QP monitoring system".

A QP server in accordance with an embodiment of the disclosure is configured to receive packets copied from an ICS network and transmit a digital command to an active probe connected to the ICS network, optionally responsive to copied packets received from the ICS network.

In an embodiment of the disclosure, a QP server comprises a packet-based network port operable to register packets copied from an ICS network and a digital output ("DO") port configured transmit a digital command signal via a digital input/output ("D i/o") channel. The QP server in accordance with an embodiment of the disclosure also comprises a memory storing a set of instructions and a processor that, when executing the set of instructions, generates a digital command signal for transmission by the DO port responsive to one or more copied packets received from the ICS.

In an embodiment of the disclosure, the D i/o channel comprises a plurality of digital input/output lines, each digital input/output line of the plurality of digital input/output lines being operable to be in a state selected from: an ON state and an OFF state, and the respective states of each of the plurality of D i/o lines, optionally at a given time, represents a binary code encoding the digital command signal.

A QP monitoring system in accordance with an embodiment of the disclosure comprises a QP server in accordance with an embodiment of the disclosure and an active probe operable to receive a digital command signal from the QP server and configured to initiate a scan of the ICS network responsive to receiving the digital command signal.

For convenience of presentation, an active probe in accordance with an embodiment of the disclosure may be referred to herein as a "interactive probe" or "iActive probe".

In an embodiment of the disclosure, scanning the ICS network comprises transmitting at least one query packet to one or more end device controllers connected to the ICS network, wherein a query packet is a packet configured to elicit, optionally as part of a scan comprising a plurality of query packets, at least one status packet from an end device controller to which the query packet is directed.

In an embodiment of the disclosure, an iActive probe comprises a packet-based port operable to inject packets into an ICS network and a digital input port ("DI port") operable to receive digital command signals from a D i/o channel. The iActive probe in accordance with an embodiment of the disclosure further comprises a memory storing a set of instructions and a processor that, when executing the set of instructions, generates at least one query packet responsive to a digital command signal received by the DI port.

In an embodiment of the disclosure, a QP server receives copied packets from the ICS network through a network data copier (NDC), by way of example a switch comprising a mirror port or a network tap, operable to copy ICS packets being propagated through the ICS network to generate packet copies and forward the packet copies to the QP server, while allowing the ICS packets to continue to their respective intended destinations. Optionally, QP server is connected to the NDC via a one-way data-link that is configured to allow transmission of packets from the NDC to the QP server and block transmission of packets from the QP server to the NDC.

In an embodiment of the disclosure, query packets transmitted by an active probe, optionally the iActive probe, comprise a field (which may be referred to herein as a "pseudosequence field") that encodes a pseudorandom (PRN) number generated by a PRN generator. A QP server in accordance with an embodiment of the disclosure is optionally configured to generate a PRN (which may be referred to as an "expected PRN") based on a same PRN generator and a same initial value as the iActive probe each time the QP server registers a new query packet from the iActive probe. Optionally, the QP server compares the PRN ("extracted PRN) extracted from the pseudosequence field comprised in the newly received query packet with the newly generated expected PRN. If the extracted PRN and the expected PRN do not match, then the QR server determines the query packet is unauthorized, and optionally takes an action responsive to the determination.

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the specification and claims is considered to be the inclusive "or" rather than the exclusive or, and indicates at least one of, or any combination of items it conjoins.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

In the detailed description below, compositions according to embodiments of the invention, methods of their manufacture, and methods of treatment comprising using the compositions for treatment of flea and tick infestation are described.

Figure 1:
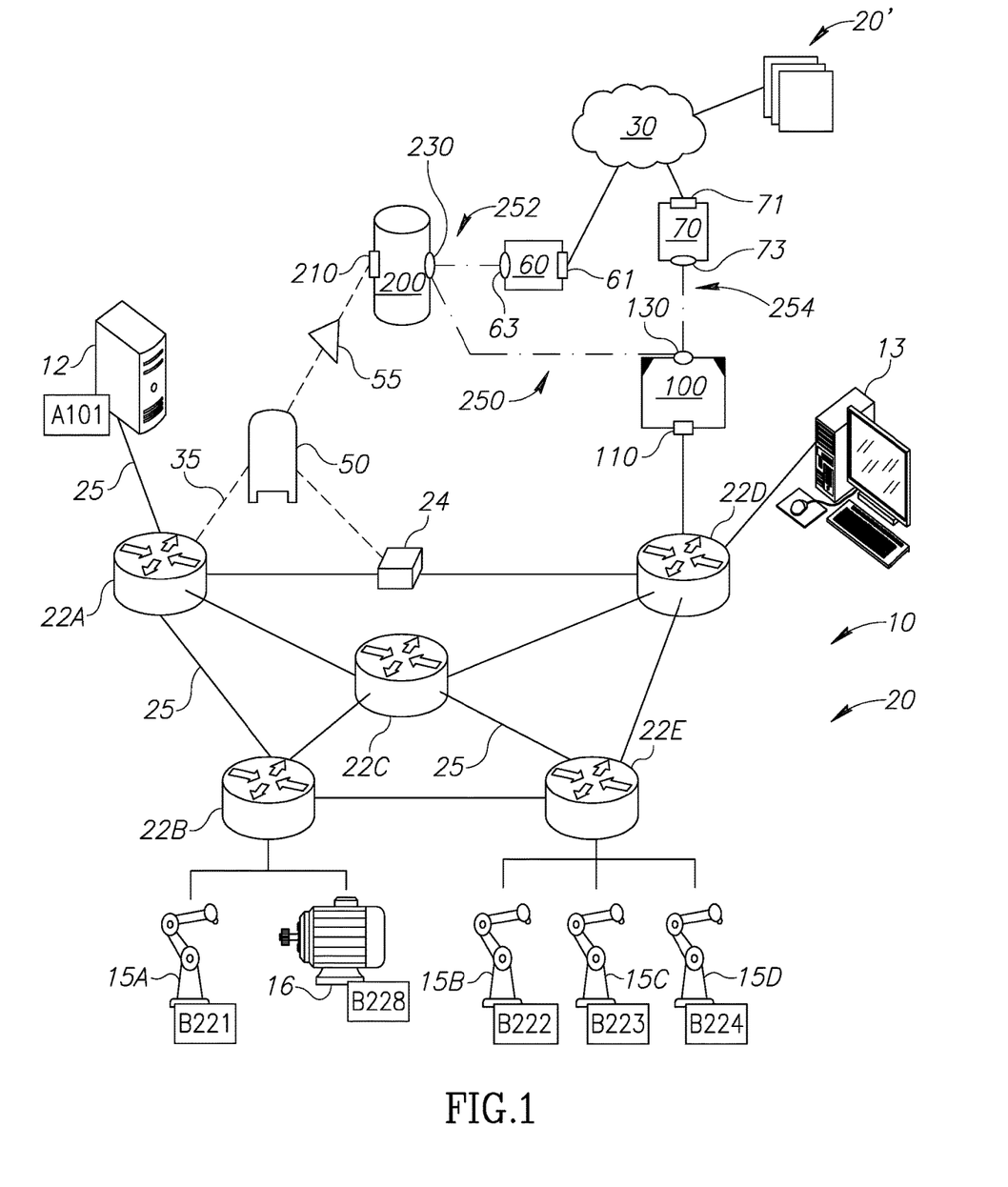
FIG. 1 schematically shows an ICS network connected to an iActive probe and a QP server in accordance with an embodiment of the disclosure.

Reference is made to FIG. 1 that schematically illustrates an exemplary industrial plant comprising an ICS 10. ICS 10 comprises an ICS controller 12 and an ICS network 20 comprising five switches 22A-E that connect the ICS controller to network-connectable field devices such as computer workstation 13, robots 15A-D and a motor 16. ICS network 20 may also connect the field devices to each other. The network connections of the ICS network are schematically represented as solid lines 25. The ICS 10 may operate under a given industrial protocol and use ICS network 20 to transmit packets between ICS controller 12 and the field devices. Each field device connected to the ICS network, including the ICS controller, may be identified with a unique unit identifier in accordance with a given industrial protocol. Examples of industrial protocols include Modbus, DNP3, IEC 60870-5-104 and IEC 61850.

Packets in accordance with the given industrial protocol may encode a unit identifier ("unit ID") in a source field or destination field, as appropriate, in order to transmit packets to their desired destinations. By way of example, ICS elements shown in FIG. 1 are each assigned a unit ID in accordance with the following chart:

CHART 1

| FIG. 1 ICS element | Unit ID |
| --- | --- |
| ICS controller 12 | A101 |
| Robot 15A | B221 |
| Robot 15B | B222 |
| Robot 15C | B223 |

CHART 1-continued

| FIG. 1 ICS element | Unit ID |
|---|---|
| Robot 15D | B224 |
| Motor 16 | B228 |

ICS network 20 comprises a NDC, optionally a network tap 24 configured to forward copies of packets traversing a network path 25 between switches 22A and 22D. Additionally alternatively, ICS network 20 comprises switch 22A (a "mirror-port switch") hat comprises a mirror port (not shown) configured to copy packets that traverse switch 22A and forward the copied packets. The transmission routes of packets copied from network 20 by network tap 24 or mirror-port switch 22A are schematically represented as dashed lines 35.

In an embodiment of the disclosure, a QP monitoring system comprises a QP server 200 that is configured to register packets received from a NDC, by way of example network tap 24 or port-mirroring switch 22A, an active probe 100 configured to scan the ICS network, with passive server 100.

Whereas FIG. 1 only shows one network tap 24 and one mirror-port 22A, it will be appreciated that other network paths 25 in ICS network 20 may be tapped by a network tap, and any of the other switches, by way of example switches 22B-22D, may be a mirror-port switch, and that passive server 200 optionally receives copied packets, directly or indirectly, from a plurality of network taps and/or mirror-port switches.

Optionally, the copied packets are not transmitted directly to passive server 200 from an NDC. Optionally, a plurality of NDCs, by way of example network 24 and mirror-port switch 22A as shown in FIG. 1, direct their copied packets to interceptor 50, which in turn forwards the copied packets to passive server 200.

Optionally, interceptor 50 is configured to forward packets to QP server 200 via a one-way data-link 55 configured to allow passage of packets directed away from ICS network 20 but not allow passage of packets directed towards the ICS network. Optionally, one-way data-link 55 comprises a fiberoptic data diode, in which a first end of an optical fiber connection comprises an optical transmitter but not an optical receiver, and a second end of the optical fiber connection comprises an optical receiver but not an optical transmitter, so that the diode is capable of forwarding digital signals form the first end of the optical fiber connection to the second end of the optical fiber connection, but is incapable of forwarding digital signals in the other direction.

In an embodiment of the disclosure, QP server 200 comprises a packet-based network port 210 operable to register packets copied from ICS network 20, optionally via network tap 24 or port-mirroring switch 22A, and a digital output ("DO") port 230 configured to transmit a digital command signal via a digital input/output ("D i/o") channel, schematically indicated by dot-dash line 250. Moreover, QP server 200 comprises a memory (not shown) storing a set of instructions and a processor (not shown) that, when executing the set of instructions, generates a digital command signal for transmission by DO port 230. Optionally, the digital command signal is generated responsive to one or more copied packets received from ICS network. Alternatively or additionally, the digital command signal is generated responsive to input from a QP server terminal (not shown). Optionally, the processor is operable to, when executing the set of instructions, generate a user alert responsive to one or more copied packets received from ICS network.

In an embodiment of the disclosure, QP server 200 is configured to receive, store, and analyze packets copied from ICS network 20. Optionally, the copied packets comprise status packets transmitted by end device controllers in response to query packets from an active probe, optionally iActive probe 100. Additionally or alternatively, the copied packets comprise query packets. Additionally or alternatively, the copied packets comprise operational packets that are transmitted from one end device controller to another end device controller to coordinate actions of end devices within an ICS.

In an embodiment of the disclosure, QP server 200 is configured to generate and transmit a digital command signal through DO port 230 to iActive probe 100, responsive to analysis of packets copied from ICS network 20.

In an embodiment of the disclosure, iActive probe 100 comprises a packet-based network port 110 operable to inject packets into an ICS network, and a digital input port ("DI port") 130 operable to receive digital command signals from D i/o channel 250. The iActive probe further comprises a memory storing a set of instructions and a processor that, when executing the set of instructions, initiate a scan of ICS network 20 responsive to a digital command signal received by DI port 130. [start here]

D i/o channel 250 in accordance with an embodiment of the disclosure comprises one or more D i/o lines (not shown). Each D i/o line is operable to be in either an ON state or an OFF state as controlled by a DO port to encode a digital command signal, and a DI port is configured to register the state of the one or more D i/o lines and determine the digital command signal encoded by the state of the D i/o lines. The ON and OFF states may be defined by the voltage applied to a D i/o line, in which the ON state is defined as the voltage being above a predefined threshold and the ON state is defined as the voltage being below a predefined threshold. It will be appreciated additional D i/o line increases the number of different digital command signals available for a D i/o channel by a factor of two. By way of numerical example, a D i/o channel having one D i/o line can transmit a maximum of two possible digital command signals, a D i/o channel having four (4) D i/o lines can transmit a maximum of sixteen (16) possible digital command signals, and a D i/o channel having seven (7) D i/o lines can transmit a maximum of one hundred twenty eight (128) possible digital command signals. Optionally, one D i/o line is designated for encoding an initiation signal for a scan identified by an scan ID encoded by the remaining D i/o lines. By way of numerical example, D i/o channel 250 comprises five (5) D i/o lines, of which four (4) D i/o lines are designated for encoding a scan ID and one D i/o line is designating for encoding an initiation signal for the scan identified by the scan ID.

Optionally, QP server 200 and iActive probe 100 are directly connected via D i/o channel 250. Alternatively, QP server 200 and iActive probe are indirectly connected, in which D i/o channel 252 from QP server 200 as well as D i/o channel 254 from iActive probe 100 are each connected to a packet-based network 30 via digital signal-to-packet (D2P) converter 60 and packet-to-digital signal (P2D) converter 70, respectively. D2P converter 60 comprises a DI port 63 configured to receive digital command signals from QP server 200 via D i/o channel 252 and a packet network port 61, and is operable to convert a digital command signal into a data packet encoding the digital command signal and transmit the packet to P2D converter 70 via network 30. P2D converter 70 comprises a packet network port 71 and a DO port 73 configured to transmit digital command signals via D i/o channel 254 to iActive probe 100, and is operable to extract a digital command signal encoded in a data packet received from D2P converter 60 and transmit the digital command signal via D i/o channel 254 to iActive probe 100.

In a case where QP server 200 transmits digital command signals indirectly through network 30, the QP server optionally transmits digital command signals to one or more iActive probes (not shown) connected to one or more of remote ICS's 20'.

Advantageously, QP server 200 being operatively connected to iActive probe 100 via D i/o channel 250 allows for an active probe whose scanning activity for ICS network 20 is responsive to events in the ICS network. Examples of controlling active probe scanning based on ICS network events include the following:

Example 1—Safe Scan

Volume of network traffic in ICS network 20 may rise and fall over the course of a day or a week. By way of example, network traffic of operational packets in ICS network 20 during operation of the end devices controlled by ICS 10 may be relatively high during weekday working hours compared to weekday evening hours or the weekend. It can be advantageous to control an active probe to perform scans when ICS network 20 is not otherwise being in use.

Optionally, QP server 200 is configured to monitor volume of packet traffic in ICS network 20, and transmit a digital command signal via D i/o channel 250 to instruct iActive 100 to initiate a scan of ICS network 20 when packet traffic volume of ICS network 20 falls below a predefined threshold. Optionally, QP server 200 is configured to create a model of network traffic volume of ICS network 20, by way of example over a time-course of a day or a week, and schedule times to instruct iActive probe 100 to conduct scans of the ICS network, responsive to the model.

Example 2—Leftover Scan

Optionally, QP server 200 is configured to monitor query packets injected into ICS network 20 by iActive probe 100 or any other active probe or scanner during a monitoring period. Optionally, QP server 200 maintains a record of types of query packets received from the ICS network during the monitoring period. Query packet types are optionally categorized based on scan type and/or target end device controller. After the end of the monitoring period, QP server 200 optionally transmits digital command signals instructing iActive 100 to perform scans, categorized based on scan type and/or target end device controllers, that the ICS network was not subjected to during the monitoring period. By way of example if QP server 200 determines that the ICS network was not subject to a log scan during the monitoring period, the QP server instructs iActive probe 100 to perform a log scan. Alternatively or additionally, the QP server transmits digital command signals instructing iActive 100 to desist from performing scans that the ICS network was already subjected to during the monitoring period. Optionally, Active 100 is programmed to perform a given scan type at regular intervals, but is operable to be prevented by the QP server from performing the given scan type if the QP server detected that another scanner has recently performed the same scan type.

Example 3—Follow-up Scan

Optionally, analysis of packets copied from ICS network 20 by QP server 200 comprises detecting presence of an irregularity in one or more status packets from an end device controller that indicates a possible threat in ICS 10, by way of example a presence of malware or an intrusion into ICS network 20 by an unauthorized user. Optionally, QP server 200 is configured to transmit a digital control signal instructing iActive probe 100 to perform a follow-up scan of an end device controller, responsive to the end device controller being designated as a possibly compromised by the QP server.

Malware or a malicious intruder who gained access to ICS 10 may direct or reprogram one or more end device controllers to execute actions not intended by an authorized operator of the ICS, which may result in end device controllers being rendered inoperable or unresponsive, or otherwise cause unexpected changes to a configuration, device logic, or identity of end device controllers comprised in the ICS. By way of example, end device controller for robot 15A may have its device ID improperly changed from "B221" to a different device ID, be rendered unresponsive, have its device logic reprogrammed so that robot 15A executes operations that damages itself or others nearby, or have its device log modified or erased.

An active probe may conduct a Keep-Alive Scan (which may be alternatively referred to as a Ping Scan), in which the active probe transmits one or more query packets ("Keep-Alive query packets") instructing an end device controller to respond with a status packet (a "Keep-Alive status packet") indicating presence on the ICS network. QP server 200 optionally designates an end device controller as possible compromised if reception of a Keep-Alive query packet directed to the end device controller is not followed by reception of a corresponding Keep-Alive status packet from the end device within a predetermined time window. Additionally or alternatively, QP server 200 designates an end device controller as possibly compromised if reception of a Keep-Alive status packet from the end device controller is not preceded by reception of a corresponding Keep-alive query packet within a predetermined time window.

Alternatively or additionally, an active probe may conduct a Non-Intrusive Scan, in which the active probe transmits one or more query packets ("Non-Intrusive query packets") instructing an end device controller to respond with a status packet (a "Non-Intrusive status packet") comprising configuration details stored in a memory of the end device controller. As used herein, a Non-Intrusive Scan refers to a scan for configuration details of the end device controller, which the end device controller allows to be transmitted in a status packet (a "Non-Intrusive status packet") without first requiring that the active probe, or a user of the active probe, be logged into the end device controller, optionally through password protection. QP server 200 optionally designates an end device controller as possibly compromised if configuration details comprised in a Non-Intrusive status packet from the end device controller is different compared to a previously-received Non-Intrusive status packet from the same end device controller.

Alternatively or additionally, an active probe may conduct an Intrusive Scan, in which the active probe transmits one or more query packets ("Intrusive query packets") instructing an end device controller to respond with a status packet (an "Intrusive status packet") comprising a copy of a device logic and/or a checksum stored in a memory comprised in the end device controller. QP server 200 optionally designates an end device controller as possibly compromised if the device logic or checksum comprised in an Intrusive status packet from the end device controller is different compared to a previously-received Intrusive status packet from the same end device controller.

Alternatively or additionally, an active probe may conduct a Log Scan, in which the active probe transmits one or more query packets ("Log query packets") instructing an end device controller to respond with a status packet (a "Log status packet") comprising a copy of an activity log stored in a memory comprised in the end device controller. QP server 200 optionally designates an end device controller as possibly compromised if the activity log comprised in a Log status packet from the end device controller is inconsistent with the operational history of the ICS in accordance with other packets received by QP server 200.

End device controllers may be configured to spontaneously transmit broadcast messages to, by way of example, inform other ICS elements of their destination IP or MAC address. Broadcast messages typically are a subset of all packets transmitted by an end device controller. Other packets that may be transmitted by an end device controller include status packets transmitted in response to query packets, and operational packets transmitted to other end device controllers to coordinate device actions within an ICS. Transmission of no packets other than broadcast packets may be an indication that the end device controller is not operating properly, or that the end device controller is possibly compromised.

Optionally, QP server 200 is configured to designate as possibly compromised an end device controller that has transmitted only broadcast messages within a pre-defined time interval. By way of example, QP server 200 is configured to designate the controller for robot 15C as being possibly compromised if the controller has transmitted only broadcast messages during the previous 7 days.

Optionally, upon designating an end device controller as possibly compromised, QP server 200 is configured to, via D i/o channel 250, instruct iActive probe 100 to initiate a follow-up scan of the possibly compromised end device controller. Optionally, the follow up scan is a same scan type as, or a different scan type from, from the scan type through which the QP server detected the possibly compromised end device controller.

Example 4—Backup Scan

Active probes are, in some cases, programmed to perform a given type of scan according to a pre-defined schedule. An active probe performing a scan at an unscheduled time, or not performing a scheduled scan, may be an indication that the active probe has been compromised.

Optionally, QP server 200 is configured to timestamp, or extract a timestamp from, a copied query packet, and generate or update a timestamp sequence for a query packet type to which the newly received query packet corresponds. A query packet type is optionally categorized based on scan type and/or target end device controller. A given timestamp sequence stored in QP server 200 is optionally limited to a predetermined number of timestamps. By way of an example, QP server 200 stores and updates in real time a timestamp sequence comprising the ten (10) most recent timestamps for Keep-Alive query packets directed to motor 16, so that when a new qualifying query packet is received by QP server 200, the earliest timestamp in the timestamp sequence is erased and the newest timestamp is added to the timestamp sequence.

Optionally, QP server 200 is configured to compare a timestamp sequence or portion thereof for a given query packet type against a reference schedule for the query packet type, and designate the active probe as possibly compromised if the timestamp sequence or a portion thereof does not correspond within a predetermined level of error to the reference schedule. Alternatively or additionally, QP server 200 is configured to compare a timestamp sequence or portion thereof for a given query packet type against a reference schedule for the query packet type and, if the scan was not performed as expected according to the reference schedule, transmit a digital command signal via D i/o channel 250 instructing iActive probe 100 to initiate a backup scan of the same scan type to make up for the missed scan.

Where the query packet type is scheduled to be transmitted by an active probe at a regular time interval, the reference schedule optionally comprises or consists of a single reference time interval RTI, which is compared against a time interval value calculated from the timestamp sequence. By way of example, the time interval value may be a difference between the two most recent entries in the timestamp sequence or an average time difference calculated from a larger portion or all entries from the timestamp sequence. An active probe may be programmed to inject a given query packet type at predetermined times during the day, but not at regular intervals. In such case, a reference schedule may comprise a sequence of a plurality of reference time intervals. By way of a numerical example, an active probe may be programmed to inject a Log query packet directed to robot 15B daily at 9 AM, 12 PM, and 5 PM, for which a reference schedule may be a sequence of three reference time intervals RTI -1, RTI-2, and RT1-3 covering a 24 hour period, having the values, respectively, of 3 hours (for the 9 AM to 12 PM interval), 5 hours (for the 12 PM to 5 PM interval), and 16 hours (for the 5 PM to 9 AM interval).

Optionally, a reference schedule is a predetermined schedule, by way of example a lookup table, that was uploaded to QP server 200 by a user. Alternatively, QP server 200 operating in a learning mode, under an assumption that the timestamps comprised in a timestamp sequence are free of error or malicious modification, is configured to generate a reference schedule for a query packet type responsive to a timestamp sequence corresponding to the query packet type. By way of example, QP server 200 determines a plurality of calculated time intervals based on differences between neighboring timestamps in a given timestamp sequence. If all the calculated time intervals are substantially equal in value within a predetermined tolerance, an average time interval is calculated and designated as an RTI for the query packet type. By way of another example, if all the calculated time intervals reveal a repeating pattern of time intervals then the plurality of RTIs comprising a single cycle of the repeating pattern is designated as the reference schedule. By way of numerical example, if a set of calculated time intervals reveal a repeating patter of 6 hours, 6 hours, and 12 hours, then QP server 200 designates the reference schedule to comprise of three RTIs: RTI-1 having a value of 6 hours, RTI-2 having a value of 6 hours, and RTI-3 having a value of 12 hours.

Whereas the disclosure above refers to query packets transmitted from an active probe, it will be appreciated that query packets can be injected into ICS network 20 from other sources, such as a scanner device. Whereas the disclosure above refers to status packet being transmitted by end device controllers, it will be appreciated that status packets may be transmitted in response to a query packet by other ICS elements, such as ICS controller 12. It will also be appreciated that an end device controller may be a PLC.

Figure 2:
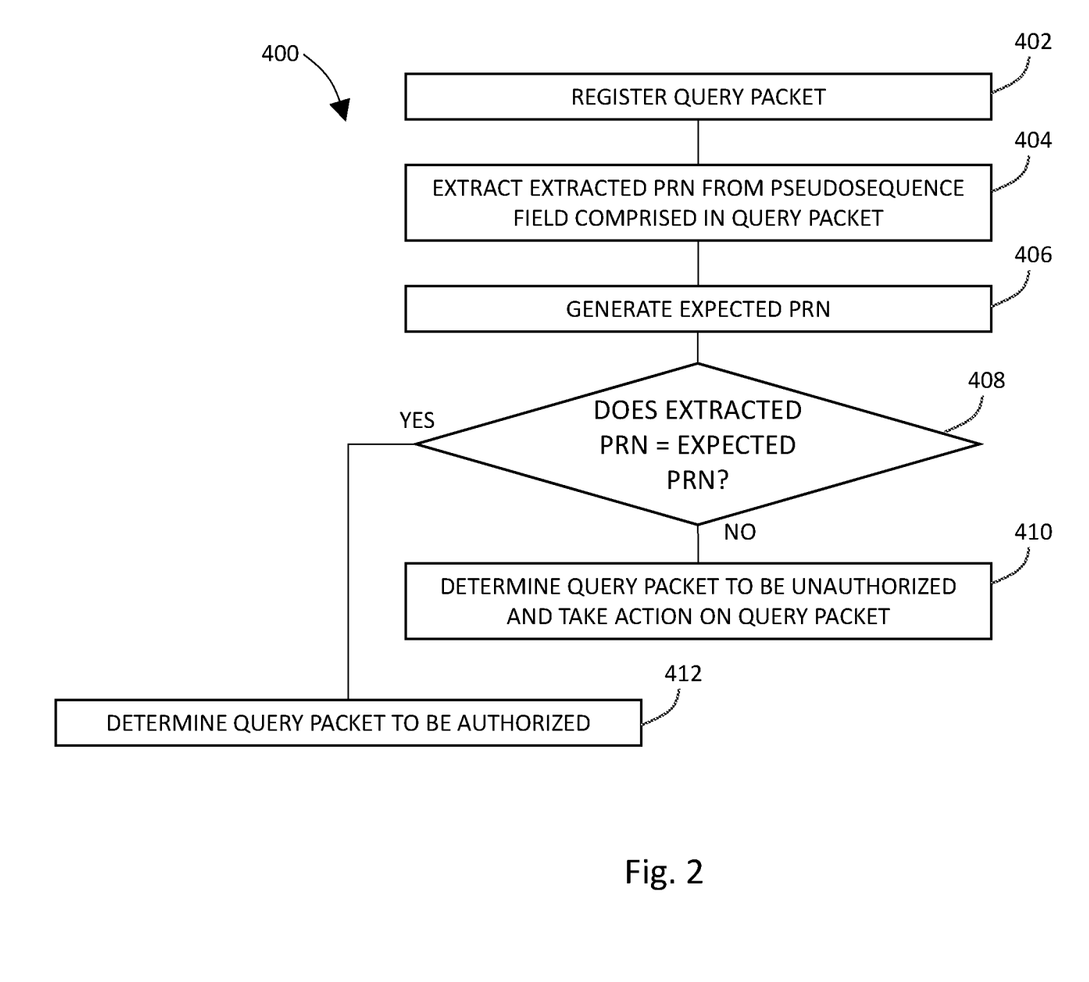
FIG. 2 shows a flow diagram for a pseudosequence method in accordance with an embodiment of the disclosure.

Reference is made to FIG. 2, which shows a flow diagram of a Pseudosequence security method 400.

In an embodiment of the disclosure, query packets transmitted by an active probe, optionally iActive probe 100, comprises a "pseudosequence field" that encodes a pseudorandom (PRN) number, in which the pseudosequence field of each new query packet generated by the active probe encodes a new PRN. Optionally, each new PRN number is determined in accordance with a PRN sequence generated by a PRN generator (not shown) comprised in the active probe. In an embodiment of the disclosure, the pseudosequence field is an existing field, optionally in the packet header, supported by a query packet format known in the art, which is repurposed as the pseudosequence field, by modifying the value of the field to encode a PRN. Optionally, the packet header field repurposed as the pseudosequence field is one or both of a time-to-live (TTL) field (alternatively referred to as a hop limit field) and an IPID field (alternatively referred to as an identification field).

In an embodiment of the disclosure, QP server 200 comprises a same PRN generator (not shown) as iActive probe 100, and is configured to perform, in accordance with a set of instructions stored in a memory (not shown), Pseudosequence method 400 in accordance with an embodiment of the disclosure. In a block 402, the QP server registers a new query packet from iActive probe 100. Upon registration of the new query packet, the QP server, in a block 404, extracts the PRN (extracted PRN) encoded in the pseudosequence field of the received query packet, and, in a block 406, generates a new PRN (which may be referred to as an "expected PRN"). In a decision block 408, QP server 200 compares the extracted PRN with the expected PRN. In a block 410, if the PRN extracted from the query packet and the new expected PRN do not match, then QR server 200 determines the query packet to be unauthorized and takes an action responsive to the determination, by way of example block or ignore the query packet, and optionally, status packets responsive to the query packet received by QR server 200. Optionally, QR server 200 also determines that iActive probe 100 is possibly compromised, and takes an action responsive to the determination, by way of example transmitting an alert to a QR server terminal regarding iActive probe 100 being possibly compromised. In a block 412, if the PRN extracted from the query packet and the new expected PRN match, then QR server 200 determines the query packet to be authorized, and QR server 200 does not block the query packet.

Optionally, the PRN is further modified through encryption. Optionally, PRNs encoded in the pseudosequence field by iActive probe 100, as well as PRNs generated as an expected PRN in QP server 200 are generated based on a Pseudo-Random-Permutation (PRP) Algorithm, by way of example 3DES, in which both iActive probe 100 and QP server 200 have stored in their respective memories a shared key SK, and a shared initial vector value IV. Output O of a PRP algorithm to generate a sequence of k PRNs responsive to shared key SK may be expressed by the formula:

$$O_k = PRP\_\{SK,IV\}(r//k) \quad \text{(Formula 1)}$$

wherein:
k is a cyclic counter;
r is a stream of random bits having a length of $L_r$ bits; and
r//k denotes adding a prefix of random bits r to cyclic counter k.

iActive probe 100 optionally generates a query packet having a pseudosequence field by converting the first 8 bits of $O_k$ to a decimal (base 10) value, which is then set as the value of the query packet's TTL field (1 byte in length), and converting the subsequent 16 bits (bits 9 to 25) of $O_k$ to a base 10 value, which is then set as the value of the query packet's IP ID field (2 bytes in length). Optionally, the next 8 bits of $O_k$ is used to set a value for the Source Port of the query packet.

Optionally, if the resulting decimal value for the first 8 bits of $O_k$ is less than a threshold value, random bits r is regenerated until the decimal value is larger than the threshold value. Even if the TTL field has the repurposed function as part of a 3-byte long pseudosequence field, the field is still used as a TTL field. As such, the value of the TTL field is checked to be sufficiently high so the query packet is allowed enough hops to reliably reach its destination. As such, the threshold value may be different for different ICS networks.

A numerical example, for using 3DES in CBC mode to generate a pseudosequence field will now be presented. Let shared key SK be a 168 bit secret key, valued as a string of 168 zeroes, stored in a memory of QP server 200 as well as in a memory of iActive probe 100; let initial vector value IV be a 128 bit value that, in hexadecimal form, is 39dfa55283318d31. A first output $O_1$ based on a 3DES algorithm to generate a sequence of PRNs responsive to shared key SK may be expressed by the formula:

$$O_1 = 3DES\_\{SK,IV\}(r//1) \quad \text{(Formula 2)}$$

wherein:
the prefix of random bits r is a string of zeros having a length $L_r$ of 44 bits;
cyclic counter "1" is a value having a length of 20 bits that increases in value at each cycle;
and
r//1 is a value having a length of 64 bits.

$O_1$ as calculated in accordance with Formula 2 is a hexadecimal integer having a value 21d4f3d864b3f0cf.

The first 8 bits of $O_1$, which is represented as the first two digits "21" of hexadecimal ("hex") integer 21d4f3d864b3f0cf, is converted to base 10. The value 21 in hex is equivalent to 33 in base 10. As such, the value of the TTL field in the first query packet is set as 33.

The subsequent 16 bits of $O_1$, which is represented as the subsequent four digits "d4f3" of hexadecimal integer 21d4f3d864b3f0cf, is converted to base 10. The value d4f3 in hex is equivalent to 54,515 in base 10. As such, the value of the IP ID field in the first query packet is set as 54,515. The TTL and IP ID fields are thus set with a PRN based on the first 24 bits of $O_1$ and serve in combination as the pseudosequence field of the query packet.

The subsequent 8 bits of $O_1$, which is represented as the digits "d8" of hexadecimal integer 21d4f3d864b3f0cf, is used to set the value for the Source Port of the query packet. The iActive probe designates d8 as an LSB (least significant bit) and adds a random byte as an MSB (most significant bit), in this case 00, to generate a Source Port having a value 00d8 in hex, which is then converted to the base 10 equivalent of 216.

It will be appreciated that the remaining bits of $O_1$ may be used to create a pseudosequence field and Source Port for a second query packet. Once the bits of $O_1$ is used up, iActive probe creates a new output $O_2$ based on the same 3DES algorithm to provide additional PRNs.

There is therefore provided in accordance with an embodiment of the disclosure a packet monitoring apparatus for monitoring packets copied from an ICS network, the apparatus comprising: a packet-based network port operable to register packets copied from the ICS network; a digital output port configured to transmit a digital command signal via a digital input/output channel; a memory storing a set of instructions; a processor that, by executing the set of instructions, performs an analysis of a plurality of packets copied from the ICS network and generates a digital command signal for transmission via the digital input/output channel responsive to the analysis.

There is also provided in accordance with an embodiment of the disclosure an active probe comprising: a packet-based network port operable to inject query packets into the ICS network; a digital input port operable to register a digital command signal from a digital input/output channel; a memory storing a set of instructions; and a processor that, when executing the set of instructions, generates and transmits at least one query packet into the ICS network responsive to a digital command signal registered by the digital input port.

There is also provided in accordance with an embodiment of the disclosure system for controlling active scanning of an ICS network responsive to ICS network activity, the system comprising: a packet monitoring apparatus in accordance with an embodiment of the disclosure and an active probe in accordance with an embodiment of the disclosure. Optionally, the active prove generates and transmits at least one query packet into the ICS network responsive to a digital command signal received from the packet monitoring apparatus.

Optionally, the system further comprises at least one network data copiers (NDC) operable to: intercept a packet being propagated through the ICS network; copy the packet to generate a packet copy; allow the packet to continue to its intended destination; and forward the packet copy to a second destination, wherein the at least one NDCs is configured to forward the packet copy to the packet monitoring apparatus. Optionally, the at least one NDC is selected from the group consisting of: a network switch comprising a mirror port and a network tap.

Optionally, the system further comprising a one-way data-link connecting the NDC and the packet monitoring apparatus, wherein the one-way data-link is configured to allow passage of packets directed from the ICS network but not allow passage of packets directed towards the ICS network. Optionally, the one-way data-link comprises a fiberoptic data diode comprising an optical fiber connection, an optical transmitter, and an optical receiver, wherein: a first end of the optical fiber connection comprises an optical transmitter but not an optical receiver, and a second end of the optical fiber connection comprises an optical receiver but not an optical transmitter.

In an embodiment of the disclosure, the digital input/output channel comprises a plurality of digital input/output lines, each digital input/output line of the plurality of digital input/output lines being operable to be in a state selected from: an ON state and an OFF state. Optionally, the digital output port is operable to generate the digital command signal by controlling the state of each of a plurality digital input/output lines. Optionally, the digital input port is operable to register the digital command signal by detecting the state of each of the plurality of digital input/output lines. Optionally, the respective states of each of the plurality of digital input/output lines at a given time represents a binary code encoding the digital command signal.

In an embodiment of the disclosure, the query packet comprises a pseudosequence field having a field value based on a pseudorandom number (PRN) number generated by a PRN generator responsive to an initial value. Optionally, the pseudosequence field consists of one or more fields comprised in the query packet, optionally in a header of the query packet. Optionally, the one or more fields is one or both of: a time-to-live (TTL) field and an identification field.

In an embodiment of the disclosure, the packet monitoring apparatus and the active probe are each operable to produce an identical sequence of PRNs. Optionally, the packet monitoring apparatus and the active probe each comprise an equivalent PRN generator; and the respective memories of the packet monitoring apparatus and the active probe each store a shared secret value that is used by the PRN generator to generate the sequence of PRNs.

In an embodiment of the disclosure, the processor comprised in the packet monitoring apparatus, when executing the set of instructions: generates an expected PRN based on the PRN generator and the shared secret value, responsive to receiving a query packet transmitted from the active probe; extracts an extracted PRN from a pseudorandom field comprised in a query packet generated by the active probe; and determine the query packet to be unauthorized if the expected PRN does not match the extracted PRN.

In an embodiment of the disclosure, the analysis of the plurality of copied packets performed by the packet monitoring apparatus comprises monitoring volume of packet traffic in the ICS network. Optionally, the digital command signal is generated and transmitted to the active probe responsive to the volume of packet traffic in the ICS network falling below a predefined threshold.

In an embodiment of the disclosure, the analysis of the plurality of copied packets performed by the packet monitoring apparatus comprises maintaining a record of types of scan performed on the ICS network during a monitoring period. Optionally, the digital command signal is encoded to instruct the active probe to perform a scan that was not performed on the ICS network during the monitoring period.

There is also provided in accordance with an embodiment of the disclosure a method of authorizing a query packet from an active probe, the method comprising: receiving a copy of a query packet transmitted from an active probe; generating an expected pseudorandom number (PRN) based on a first PRN generator and a first secret value, responsive to receiving the query packet; extracting an extracted PRN from a pseudosequence field comprised in the query packet; and determining the query packet to be unauthorized if the expected PRN does not match the extracted PRN. Optionally, the extracted PRN is generated based on a second PRN generator that is equivalent to the first PRN generator and a second secret value that is equivalent to the first secret value.

In the description and claims of the present application, each of the verbs, "comprise," "include" and "have," and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A system for controlling active scanning of an industrial control system (ICS) network responsive to ICS network activity, the system comprising:
a packet monitoring apparatus (PMA) comprising:
a packet-based network port operable to register packets copied from the ICS network;
a digital output port configured to transmit a digital command signal via a digital input/output channel;
a memory storing a set of instructions;
a processor that, by executing the set of instructions, transmits a digital command signal via the digital input/output channel; and
an active probe comprising:
a packet-based network port operable to inject query packets into the ICS network;
a digital input port operable to receive digital command signals from the packet monitoring apparatus via the digital input/output channel;
a first pseudorandom number (PRN) generator;
a memory storing a set of instructions; and
a processor that, when executing the set of instructions, generates and transmits at least one query packet into the ICS network responsive to the digital command signal transmitted by the PMA, the at least one query packet comprising a pseudosequence field having a field value based on a PRN generated by the first PRN generator;
wherein:
the PMA comprises a second PRN generator configured to produce an identical sequence of PRNs as the first PRN generator based on a shared initial value and a shared secret key; and
the processor comprised in the PMA, when executing the set of instructions:
generates an expected PRN based on the second PRN generator responsive to receiving a copy of the at least one query packet transmitted from the active probe;
extracts an extracted PRN from the pseudorandom field comprised in the at least one query packet; and
determine the query packet to be unauthorized if the expected PRN does not match the extracted PRN.

2. The system according to claim 1, wherein:
the digital input/output channel comprises a plurality of digital input/output lines, each digital input/output line of the plurality of digital input/output lines being operable to be in a state selected from: an ON state and an OFF state;
the respective states of each of the plurality of digital input/output lines at a given time represents a binary code encoding the digital command signal.

3. The system according to claim 1, further comprising at least one network data copiers (NDC) operable to:
intercept a packet being propagated through the ICS network;
copy the packet to generate a packet copy;
allow the packet to continue to its intended destination; and
forward the packet copy to a second destination,
wherein the NDCs is configured to forward the packet copy to the packet monitoring apparatus.

4. The system according to claim 3, wherein the at least one NDC is selected from the group consisting of: a network switch comprising a mirror port and a network tap.

5. The system according to claim 4 further comprising a one-way data-link connecting the at least one NDC and the packet monitoring apparatus, wherein the one-way data-link is configured to allow passage of packets directed from the ICS network but not allow passage of packets directed towards the ICS network.

6. The system according to claim 5, wherein the one-way data-link comprises a fiberoptic data diode comprising an optical fiber connection, an optical transmitter, and an optical receiver, wherein:
a first end of the optical fiber connection comprises an optical transmitter but not an optical receiver, and a second end of the optical fiber connection comprises an optical receiver but not an optical transmitter.

7. The system according to claim 1, wherein the pseudosequence field consists of one or both of: a time-to-live (TTL) field and an identification field.

8. The system according to claim 1, wherein the PMA transmits the digital command signal responsive to an analysis of a plurality of packets copied from the ICS network.

9. The system according to claim 8, wherein the analysis of the plurality of copied packets comprises monitoring volume of packet traffic in the ICS network.

10. The system according to claim 9, wherein the digital command signal is generated and transmitted to the active probe responsive to the volume of packet traffic in the ICS network falling below a predefined threshold.

11. The system according to claim 8, wherein the analysis of the plurality of copied packets comprises maintaining a record of types of scan performed on the ICS network during a monitoring period.

12. The system according to claim 11, wherein the digital command signal is encoded to instruct the active probe to perform a scan that was not performed on the ICS network during the monitoring period.

13. A method for controlling active scanning of an industrial control system (ICS) network responsive to ICS network activity, the method comprising:
a packet monitoring apparatus (PMA) transmitting a digital command signal responsive via the digital input/output channel to an active probe;
the active probe transmitting at least one query packet into the ICS network responsive to the digital command signal, the at least one query packet comprising a pseudosequence field having a field value based on a pseurorandom number (PRN) generated by a first PRN generator comprised in the active probe; and
the PMA, responsive to receiving a copy of the at least one query packet:
generating an expected PRN based on a second PRN generator comprised in the PMA, the second PRN generator being configured to produce an identical sequence of PRNs as the first PRN generator based on a shared initial value and a shared secret key;
extracting an extracted PRN from the pseudorandom field comprised in the at least one query packet; and
determining the query packet to be unauthorized if the expected PRN does not match the extracted PRN.

14. The method according to claim 13, wherein:
the digital input/output channel comprises a plurality of digital input/output lines, each digital input/output line of the plurality of digital input/output lines being operable to be in a state selected from: an ON state and an OFF state; and the respective states of each of the plurality of digital input/output lines at a given time represents a binary code encoding the digital command signal.

15. The method according to claim 13, wherein the pseudosequence field consists of one or both of: a time-to-live (TTL) field and an identification field.

16. The method according to claim 13, wherein the PMA transmits the digital command signal responsive to an analysis of a plurality of packets copied from the ICS network.

17. The method according to claim 16, wherein the analysis of the plurality of copied packets comprises monitoring volume of packet traffic in the ICS network, and the digital command signal is generated and transmitted to the active probe responsive to the volume of packet traffic in the ICS network falling below a predefined threshold.

18. The method according to claim 16, wherein the analysis of the plurality of copied packets comprises maintaining a record of types of scan performed on the ICS network during a monitoring period, and the digital command signal is encoded to instruct the active probe to perform a scan that was not performed on the ICS network during the monitoring period.

19. The method according to claim 16, wherein plurality of packets copied from the ICS network is received by the PMA through a one-way data-link that is configured to allow passage of packets from the ICS network but not allow passage of packets directed towards the ICS network.

20. The method according to claim 19, wherein the one-way data-link comprises a fiberoptic data diode comprising an optical fiber connection, an optical transmitter, and an optical receiver, wherein a first end of the optical fiber connection comprises an optical transmitter but not an optical receiver, and a second end of the optical fiber connection comprises an optical receiver but not an optical transmitter.

* * * * *